Patented Aug. 10, 1937

2,089,809

UNITED STATES PATENT OFFICE 2,089,809

PLASTIC COMPOSITIONS AND METHOD OF MAKING SAME

Nicholas J. Penning, Chicago, Ill., assignor to The Penolite Corporation, Chicago, Ill., a corporation of Delaware No Drawing. Application October 29, 1934, Serial No. 750,593

8 Claims. (Cl. 106—23)

The present invention relates to plastic compositions and more particularly to a novel plastic composition formed of a rubber base and in the method of producing the same.

Among the objects of the present invention is to provide a novel plastic composition formed of a rubber base, the composition when compounded and vulcanized possessing rigidity and a degree of hardness combined with a workability not found or inherent in previous compositions. The invention further comprehends a material which may be readily and easily moulded or extruded to form various and sundry objects and articles of commerce having properties and advantages far superior to those of articles for similar uses or purposes made of present known compositions or materials.

Another object of the present invention is to provide a semi-hard plastic composition having a rubber base, which although possessing a marked degree of hardness can be readily and easily machined with a minimum of wear upon the machining tool. This composition may be readily sawed, turned on a lathe, milled, drilled or machined in any other manner. Because of such properties the present composition lends itself admirably to a limitless field of use, and this in addition to its low cost of manufacture secures for it advantages not found or inherent in any prior compositions.

A further object of the invention is in the novel means and method of producing the composition and in the various steps in preparing the aggregate or mass and in compounding the same.

Another object of the present invention is in the provision of a novel rubber composition which when moulded and cured or extruded and formed into articles, is of a sufficiently high gloss that the exterior of such articles need not be buffed or polished. Furthermore, such gloss is retained during the life of the material and permits its use wherever it is desired to have a smooth or polished surface.

A still further object of the invention is the provision of a novel waterproof composition and one which is practically non-inflammable.

Further objects are inherent in and will become readily apparent from the following disclosure and claims.

In the preparation of the novel composition I preferably compound the rubber mix in substantially the following proportions:

| | Parts |
|---|---|
| Rubber | 100 |
| Vulcanizing agent | 32 |
| Filler | 128 |
| Coloring matter | 4 |
| Dispersing agent | 4 |
| Wax or resin | 5 |
| Accelerator | 3 |

The rubber base employed in the novel composition may be of any kind suitable for the purpose, such as pale crepe, smoke sheet, brown crepe, roll brown, reclaim or the like.

The proportion of sulphur, using the rubber base as a unit, may be varied from substantially 25 to 40 parts to every 100 parts of rubber, depending upon the quality of rubber base employed and the use to which the ultimate finished article is to be put. I have found that when using a good grade of rubber base, approximately 32 parts of sulphur gives the desired properties to the composition.

In the present plastic, the amount of filler that is properly dispersed in the composition is extremely high. This obviously appreciably reduces the cost of the plastic compound as well as the ultimate cost of the finished products and permits a widespread use of this material over products derived from phenol resin, cellulose, and including all of the well known plastics now being employed.

The filler employed preferably forms a pliable filler as distinguished from the stiffening fillers, and I have found that thermal carbon black having a non-flocculent granular nature is most preferable for compounding the mix, although charcoal, carbon black, channel black, zinc oxide, magnesium oxide, ground cork and the like may be employed in some instances, depending upon the properties desired and use to which the finished product is to be placed. Although in my preferred embodiment I use approximately 128 parts, I find that good results are obtainable by using 100 to 150 parts of filler to every 100 parts of rubber, depending largely upon the quality of the rubber base used, it being readily apparent that where pure rubber of a good grade is employed, a greater quantity of filler may be added with excellent results, while if reclaim rubber forms the base, a lesser quantity of filler may be added since the rubber may have already a quantity of filler included therein.

In order to most thoroughly disperse the filler in the aggregate mass, the invention comprehends the use of a dispersing and softening agent such as pine tar, although petrolatum, pitch, resin, asphaltum or a coal tar product may be employed with good results. However, the use of pine tar is preferable. The quantity of the dispersing agent may normally vary between 2 and 8 parts to every 100 parts of rubber base, depending upon the product desired and the properties thereof, such as hardness, etc., as well as upon the efficiency of the dispersing agent and amount of filler to be dispersed.

The invention further comprehends the addition of a synthetic wax or resin. The quantity may vary from approximately 2 parts to 10 parts per every 100 parts of rubber base, although best results are apparently had at about 5 parts. Such wax or resin should have a comparatively high melting point and I have secured excellent results by the use of chloronaphthalene or other halogenated coal tar derivatives, although I also contemplate the use of natural waxes such as vegetable, mineral or animal waxes having a relatively high melting point and sold under various trade names. By the use of a synthetic wax such as chloronaphthalene, the resulting product when taken from the mold, already has a preliminary polish caused by or due to the surface wax. Furthermore, this wax becomes dispersed throughout the body of the mass and makes the product impervious to moisture as well as reduces the inflammability and danger resulting therefrom.

Where color is desired in the commercial product, such color may be imparted thereto by adding to the aggregate a quantity of some coloring material such as zinc oxide, iron oxide or other metallic oxides capable of imparting the desired color. The quantity of color may be varied between 4 and 16 parts to every 100 parts of rubber base, depending upon the depth of color desired. Where color is not essential or desirable it may be dispensed with.

In order to expedite the period necessary for the plastic to cure, and/or to improve the cured or vulcanized product, the invention comprehends the use of an accelerator. Such an accelerator is preferably diphenylguanidine (known commercially as D. P. G.), employed in the proportion of approximately 2 to 8 parts of D. P. G. to every 100 parts of rubber base, although other accelerators may be used with good results.

In the compounding of this rubber base plastic, the steps consist in breaking down this rubber for approximately 30 minutes and then adding thereto the desired quantity of sulphur. To this aggregate of rubber and sulphur is next added approximately one-half of the filler, preferably thermal carbon black. The remainder of the filler is then mixed with the pine tar or dispersing agent, to which is then added the chloronaphthalene or synthetic wax or resin, coloring matter and accelerator. After this latter batch has been carefully and completely mixed, it is then combined with the initial batch on the mill and the entire aggregate is then compounded into a homogeneous mass.

After the entire batch has been thoroughly compounded, it is removed from the mill and allowed to stand for a period of approximately 24 hours, after which it is returned to a cold mill and worked for approximately fifteen minutes. The resultant mix is of a doughy consistency and is then ready for moulding or extrusion.

The finished product either in its moulded or extruded state is substantially indestructible, is waterproof and is substantially non-inflammable as well as provided with a relatively high degree of gloss, whereby to eliminate in most instances the necessity of buffing or polishing the commercial product or article. Further, the dispersion of the synthetic wax or resin is throughout the mass so that the glossy finish is retained throughout the life of the product.

It will be apparent from the above disclosure that the invention comprehends a novel plastic composition or product and a novel method of producing the same. The method of mix permits a thorough standardization and uniformity in the commercial product.

Having now described my invention,
I claim:

1. A vulcanizing rubber composition including a thermal carbon black of non-flocculent nature in the proportion of approximately 100 to 150 parts and a wax of relatively high melting point in the approximate proportion of 2 to 10 parts, to every 100 parts of rubber.

2. A plastic composition comprising the following ingredients in substantially the following proportions: rubber 100 parts; vulcanizing agent 25 to 40 parts; filler 100 to 150 parts; dispersing and softening agent 2 to 8 parts; and wax 2 to 10 parts.

3. A plastic composition comprising the following ingredients in the approximate proportions: rubber 100 parts; sulphur 25 to 40 parts; thermal carbon black of non-flocculent nature 100 to 150 parts; pine tar 2 to 8 parts; and synthetic wax 2 to 10 parts.

4. A plastic composition comprising the following ingredients in the following approximate proportions: rubber 100 parts; vulcanizing agent 32 parts; filler 128 parts, dispersing and softening agent 4 parts; and wax 5 parts.

5. A plastic composition comprising the following ingredients in substantially the following proportions: rubber base 100 parts; sulphur 32 parts; thermal carbon black of non-flocculent granular nature 128 parts; pine tar 4 parts; and wax 5 parts.

6. A plastic composition comprising the following ingredients in substantially the following proportions: rubber base 100 parts; sulphur 32 parts; thermal carbon black of non-flocculent granular nature 128 parts; pine tar 4 parts, chloronaphthalene 5 parts; and an accelerator 3 parts.

7. In the method of preparing a plastic composition, the steps of breaking down a rubber base, adding thereto a vulcanizing agent and a substantial part of a desired filler, then thoroughly mixing said batch or aggregate, next mixing the remainder of said filler with a requisite amount of a dispersing and softening agent and a wax to form another batch, and thoroughly mixing and compounding said batches to form a uniform and homogeneous plastic composition.

8. The method of preparing a plastic composition, comprising the steps of breaking down a rubber base, adding thereto a vulcanizing agent and a substantial part of a desired filler, then thoroughly mixing said batch or aggregate, next mixing the remainder of said filler with a requisite amount of a dispersing and softening agent and a wax to form another batch, and thoroughly mixing and compounding said batches to form a uniform and homogeneous plastic composition, allowing said total batch to stand for a period of substantially 24 hours and again working the same to form a plastic composition ready for moulding, extrusion, etc.

NICHOLAS J. PENNING.